United States Patent [19]

Hochberg et al.

[11] Patent Number: 4,759,774
[45] Date of Patent: Jul. 26, 1988

[54] PROCESS FOR CLEANING SUBSTRATES

[75] Inventors: Jerome Hochberg; Robert B. Young, both of Wilmington, Del.

[73] Assignee: E. I. Du Pont de Nemours and Company, Wilmington, Del.

[21] Appl. No.: 922,262

[22] Filed: Oct. 23, 1986

[51] Int. Cl.$^4$ .............................................. B24D 3/06
[52] U.S. Cl. ...................................... 51/293; 51/298; 51/309; 524/423; 524/437
[58] Field of Search ......................... 51/293, 298, 309; 524/423, 430, 437

[56] References Cited

U.S. PATENT DOCUMENTS

| | | | |
|---|---|---|---|
| 3,765,923 | 10/1973 | Bender-Christensen | 51/308 |
| 3,827,933 | 8/1974 | Duggins et al. | 524/437 |
| 3,847,865 | 11/1974 | Duggins et al. | 524/437 |
| 4,125,969 | 11/1978 | Easton | 51/308 |
| 4,333,743 | 6/1982 | Nojima | 51/298 |
| 4,340,579 | 7/1982 | Greber et al. | 524/437 |
| 4,548,617 | 10/1985 | Miyatani et al. | 51/298 |
| 4,551,497 | 11/1985 | Shinozuka et al. | 524/423 |
| 4,666,465 | 5/1987 | Matsumoto et al. | 51/293 |

OTHER PUBLICATIONS

Smithsonian Magazine for Oct. 1986, pp. 48–61.
Aviation Equipment Maintenance, Oct. 1985, pp. 28–35.

Primary Examiner—Paul Lieberman
Assistant Examiner—Willie J. Thompson
Attorney, Agent, or Firm—Richard H. Burgess

[57] ABSTRACT

Particulate polymethyl methacrylate polymerized in the presence of alumina trihydrate filler provides a superior blasting media for cleaning surfaces, such as for stripping paint from sensitive substrates like aluminum aircraft skin.

6 Claims, No Drawings

PROCESS FOR CLEANING SUBSTRATES

The present invention concerns a process for removing materials such as paint from substrates.

Paint must be removed periodically from delicate substrates such as airplane skins. The usual method is by using paint removers containing harsh chemicals such as methylene chloride, as described in Smithsonian Magazine for October 1986, pp 48-61. Sand blasting and grit blasting with inorganic media are too vigorous for practical use in such jobs.

The use of alkyd plastic blasting media for such jobs is described in Aviation Equipment Maintenance, October, 1985, pp 28-35. Melamine formaldehyde resins are also used as such media. Although different grades of such media re available with different levels of aggressiveness on the substrate, it would be desirable to have a media which could work more quickly and still be more gently to the substrate at the same time.

Simulated marble is available made from polymethyl methacrylate polymerized in the presence of particles of aluminum trihydrate, as described in U.S. Pat. No. 3,847,865—Duggins (1974), incorporated herein by reference. However, the material of that patent has not been generally used as a blast media for cleaning or stripping substrates.

SUMMARY OF THE INVENTION

The present invention provides a blasting process for cleaning surfaces in which a media, entrained in a fluid such as water or air or other gases, is propelled against such surfaces wherein said media is particulate polymethyl methacrylate filled with particles of aluminum oxide material or barium sulfate.

The various forms of aluminum oxides and alumina hydrates can be used and are included in the term aluminum oxide materials. However, alumina trihydrate is preferred.

EXAMPLE 1

Filled polymethylmethacrylate containing 65% alumina trihydrate was gound in a hammermill and passed through screens. The fraction collected was between 20 and 50 mesh, preferably 20-40 mesh U.S. Standard Sieve size. A twelve inch square section of autobody steel which had been painted five years before with an epoxy type primer and an enamel topcoat was used for test purposes. A standard Schmidt (Schmidt Manuf. Co., Fresco, Tex.) sandblasting machine with a ⅜ inch (0.95 cm) nozzle and a standoff distance of eight inches (20.3 cm) at an angle of 35° to the work was used to test the media's ability to remove paint.

The paint was removed in 5 min. 40 sec., which time was shorter than for samples of unfilled methacrylates prepared in a similar manner and was comparable to other organic grit blasting media tested and superior for some applications. The same techniques could be used for removing paint from other metal or plastic parts.

We claim:

1. A blasting process for cleaning surfaces in which a media, entrained in a fluid, is propelled against such surfaces wherein
    said media is particulate polymethyl methacrylate filled with particles of inorganic materials selected from aluminum trihydrate and barium sulfate.
2. The process of claim 1 wherein the polymethyl methacrylate has been polymerized in the presence of aluminum trihydrate.
3. The process of claim 2 wherein the aluminum oxide material is alumina trihydrate plus barium sulfate.
4. The process of claim 1 wherein said media is in the form of particles having an average diameter in the range of 0.18 mm-2.0 mm.
5. The process of claim 1 in which the polymethyl methacrylate is copolymerized with ethylenically unsaturated comonomer.
6. The process of claim 1 in which the polymethyl methacrylate is copolymerized with crosslinkable monomer and the copolymer is crosslinked during manufacture of the filled polymer.

* * * * *